July 1, 1930.	J. E. NICKELL	1,769,231
CALF WEANER
Filed March 30, 1929	2 Sheets-Sheet 2
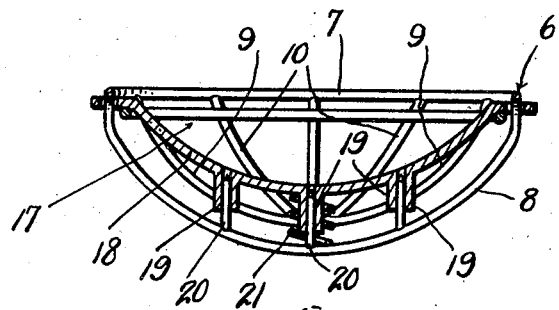
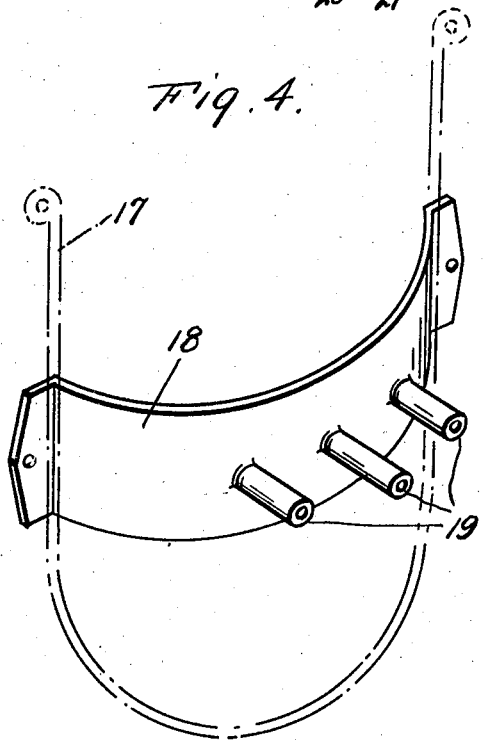
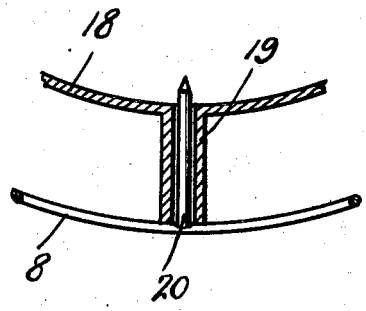
Inventor
John E. Nickell
By *Clarence A. O'Brien*
Attorney Patented July 1, 1930

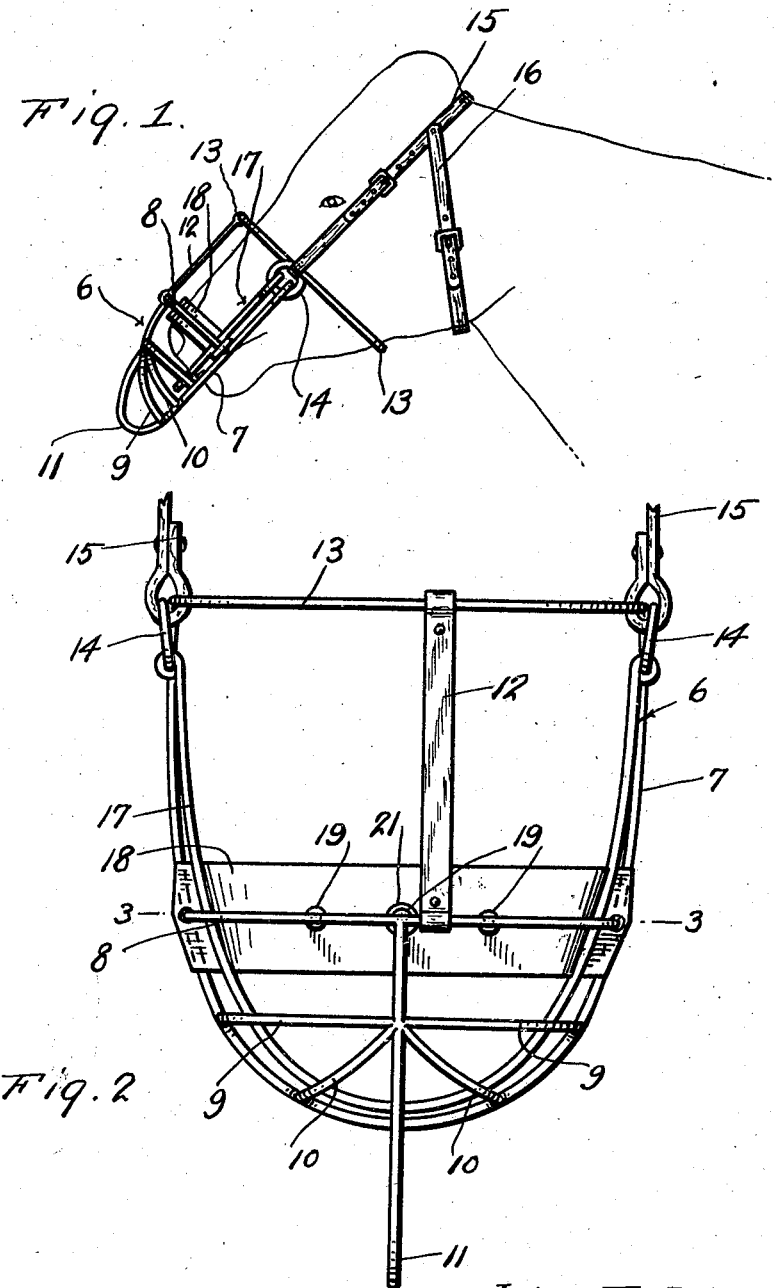

1,769,231

UNITED STATES PATENT OFFICE

JOHN E. NICKELL, OF ROOSEVELT, OKLAHOMA

CALF WEANER

Application filed March 30, 1929. Serial No. 351,188.

This invention relates to an improved calf weaner of the type adapted to be attached to the head of a calf in a manner to inflict pain, whenever the calf attempts to extract milk from the udder of the mother cow.

Briefly described, the contrivance comprises a cage which is attachable to the nose portion of the calf and which is provided with fastening and retaining means and within this cage is the pain inflicting means which is normally ineffective to permit grazing but is brought into play by motions of the head of the calf when attempting to extract milk from the udder.

In carrying out the invention I have evolved and produced a structure which is efficient in performance, positive and dependable in action, comfortable for wearing and otherwise capable of fulfilling the requirements of an invention of this class in a satisfactory manner.

In the drawings:

Figure 1 is a side elevational view of the calf weaner showing the same in position on a calf.

Figure 2 is a top plan view on an enlarged scale of the calf weaner itself.

Figure 3 is a cross section taken approximately upon the plane of the line 3—3 of Figure 2.

Figure 4 is a perspective view of the shield and its carrying frame.

Figure 5 is a fragmentary detail sectional and elevational view showing the pain inflicting spur projected to operative position.

In carrying out the invention I provide a structure which is composed principally of wire rods approximately bent and connected together. These rods are so made as to provide a nose shaped cage generally designated by the reference character 6. As seen in Figure 2, this comprises a substantially U-shaped member 7, to the intermediate portions of the arms of which an arch shaped wire 8 is connected. A plurality of said wires 9 and 10 are connected with the bight portion of the U-shaped member as seen in Figure 2 to enclose the nose and mouth portion of the wearer. The reference character 11 designates the projection which may be defined as a guard which strikes against the udder and pushes the udder out of the way to frustrate attempts of the calf.

Connected with the crown portion of the arch is a strap which is bent back and is in turn connected with a ring 13 which surrounds the head portion of the wearer. The reference character 14 designates small ring like loops with which the ends of the head straps 15 are connected. Associated with the head strap is a neck strap 16, and these straps assume the angular relationship seen in Figure 1, when in position. Thus, the cage may be held appropriately in place on the head of the animal. Arranged within the cage for relative movement is the pain inflicting means. This comprises a substantially U-shaped carrier frame, the free ends of the arm portions of which are connected with the rings 14. Carried by this frame is a semi-circular plate shield 18, provided with a plurality of sleeves 19 as shown in Figure 3. Extending through these sleeves are spurs 20 carried by the crown portion of the arch 8. A coiled spring 21 surrounds the central sleeve and spur as shown in Figure 3, to hold the shield in the position here seen and to maintain the spurs retracted and normally ineffective.

With this arrangement, it will be seen that when the device is in position on the head of the calf as seen in Figure 1, the pain inflicting means is maintained normally ineffective. Thus, so long as the head is down and the animal is grazing no interference is promoted. However, when the animal attempts to extract milk from the udder of its mother, it is obvious that the wiggling and miscellaneous motions of the head in attempting to accomplish this will bring pressure to bear against the shield 18.

The shield will be actuated against the tension of the spring 18 to allow the spurs to project through the sleeves and to inflict light pains and at the same time the engagement of the projection 11 with the udder will have a tendency to push the udder out of the way to frustrate the attempts of the calf. In this way, the device will eventually wean the calf.

A careful consideration of the description in conjunction with the drawings will enable the reader to obtain a clear understanding of the construction, operation and features and advantages of the invention. Therefore a more lengthy description is regarded unnecessary.

Minor changes in the shape, size and materials and rearrangement of details coming within the field of invention claimed may be resorted to, in actual practice, if desired.

I claim:

1. A calf weaner comprising an open work wire cage including a U-shaped member, a transverse arch, a nose projection for engagement with the udder, a head embracing ring, a strap connected between the ring and crown portion of the arch, rings connected to the inner end portions of the arms of said U-shaped member, a head strap connected with said rings, a strap connected with said head strap, and calf actuated pain inflicting means mounted in said cage.

2. A calf weaner comprising an open work wire cage including a U-shaped member, a transverse arch, a nose projection for engagement with the udder, a head embracing ring, a strap connected between the ring and crown portion of the arch, rings connected to the inner end portions of the arms of said U-shaped member, a head strap connected with said rings, a strap connected with said head strap, and a calf actuated pain inflicting means mounted in said cage and including a nose embracing shield having openings formed therein, and spurs projecting downwardly from said arch through said openings.

In testimony whereof I affix my signature.

JOHN E. NICKELL.